US009761038B2

(12) United States Patent
Baxter et al.

(10) Patent No.: US 9,761,038 B2
(45) Date of Patent: *Sep. 12, 2017

(54) USING GPU FOR NETWORK PACKETIZATION

(71) Applicant: Barco, Inc., Duluth, GA (US)

(72) Inventors: Ian Baxter, Auckland (NZ); Chris S. Byrne, San Jose, CA (US)

(73) Assignee: Barco, Inc., Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/532,961

(22) Filed: Nov. 4, 2014

(65) Prior Publication Data

US 2015/0062133 A1 Mar. 5, 2015

Related U.S. Application Data

(63) Continuation of application No. 13/395,649, filed as application No. PCT/US2010/031822 on Apr. 20, 2010, now Pat. No. 8,878,864.

(60) Provisional application No. 61/170,887, filed on Apr. 20, 2009.

(51) Int. Cl.
*G06T 15/00* (2011.01)
*H04L 29/06* (2006.01)

(52) U.S. Cl.
CPC ............ *G06T 15/005* (2013.01); *H04L 69/16* (2013.01); *H04L 69/161* (2013.01); *H04L 69/22* (2013.01); *G06T 2200/04* (2013.01); *G06T 2200/28* (2013.01)

(58) Field of Classification Search
None
See application file for complete search history.

(56) References Cited

U.S. PATENT DOCUMENTS

| 6,885,378 | B1 | 4/2005 | Tsai | |
|---|---|---|---|---|
| 7,839,854 | B2* | 11/2010 | Alexander | G06F 21/84 345/503 |
| 7,934,255 | B1* | 4/2011 | Gyugyi | G06F 21/564 713/187 |
| 2005/0188241 | A1* | 8/2005 | Cabezas | H04L 29/12264 714/4.2 |
| 2006/0098021 | A1 | 5/2006 | Rim et al. | |
| 2006/0242710 | A1 | 10/2006 | Alexander | |
| 2008/0285589 | A1 | 11/2008 | Diab | |

(Continued)

FOREIGN PATENT DOCUMENTS

KR 10-2003-0046474 A 6/2003
KR 10-2006-0044124 A 5/2006

OTHER PUBLICATIONS

Chitty, Darren M. "A data parallel approach to genetic programming using programmable graphics hardware." Proceedings of the 9th annual conference on Genetic and evolutionary computation. ACM, 2007.*

(Continued)

*Primary Examiner* — Yu Chen
(74) *Attorney, Agent, or Firm* — Aka Chan LLP (57) ABSTRACT

Information to be sent over a network, such as the Ethernet, is packetized by using a graphics processing unit (GPU). The GPU performs packetization of data with much higher throughput than a typical central processing unit (CPU). The packetized data may be output through an Ethernet port, video port, or other port of an electronic system.

32 Claims, 9 Drawing Sheets

(56) References Cited

U.S. PATENT DOCUMENTS

2008/0316218 A1    12/2008   Kilani et al.
2010/0202508 A1*   8/2010   Karaoguz .......... H04N 21/2381
                                                                        375/240.01

OTHER PUBLICATIONS

Triangle strip (Wayback Machine, https://web.archive.org/web/20080525082924/http://en.wikipedia.org/wiki/Triangle_strip, May 25, 2008).*

Yu, Qizhi, Chongcheng Chen, and Zhigeng Pan. "Parallel genetic algorithms on programmable graphics hardware." Advances in Natural Computation. Springer Berlin Heidelberg, 2005. 1051-1059.*

ARB_vertex_buffer_object (Wayback Machine, https://web.archive.org/web/20071221013230/http://www.opengl.org/registry/specs/ARB/vertex_buffer_object.txt, Dec. 21, 2007).*

* cited by examiner

Ethernet Type II Frame
(64 to 1518 bytes)

USING GPU FOR NETWORK PACKETIZATION

CROSS-REFERENCE TO RELATED APPLICATIONS

This patent application is a continuation of U.S. patent application Ser. No. 13/395,649, filed Mar. 12, 2012, issued as U.S. Pat. No. 8,878,864 on Nov. 4, 2014, which claims the benefit under 35 U.S.C. section 371 of international patent application PCT/US2010/31822, filed Apr. 20, 2010, which claims the benefit of U.S. provisional patent application 61/170,887, filed Apr. 20, 2009. These applications are incorporated by reference along with all other references cited in this application.

BACKGROUND OF THE INVENTION

This invention relates to the field of networking and more specifically to using a graphics processor to perform high-speed network packetization of data.

Networking is one of the basic building blocks of the information age, allowing computers and other electronic devices to connect to one another, to communicate and conduct transactions. Networking affects every industry including financial, banking, legal, military, high technology, transportation, telephony, oil, medical, drug, food, agriculture, education, entertainment and arts, and many others.

Despite the success of computer networking, people continue to demand greater performance and capabilities in their local area and wide area networks, including the Internet. The amount of data being transmitted over networks continues to increase. For example, people are transmitting video (e.g., high definition video and video conference), movies, images (e.g., high resolution graphics), audio, files, and many other types of information over networks. Networks facilitate vast numbers of transactions and commerce including on-line stock trading, book sales, auctions, airplane reservations, and grocery shopping, just to name a few examples.

Therefore, there is a need for improvements in networking throughput and packetization, which will enable transmission of greater amounts of data while more efficiently utilizing computing resources and power.

BRIEF SUMMARY OF THE INVENTION

Information to be sent over a network, such as the Ethernet, is packetized by using a graphics processing unit (GPU). The GPU performs packetization of data with much higher throughput than a typical central processing unit (CPU). The packetized data may be output through an Ethernet port, video port, or other port of an electronic system.

In a specific implementation, a method or technique of operating an electronic system includes: creating a first texture in memory of a graphics processing unit of the system; reserving a number of first locations in the first texture as headers; reserving a number of second locations in the first texture as footers; reserving a number of third locations in the first texture as spans, where each of the spans are rectangular, and positioned between a header and footer; copying first data for packetization into the spans of the first texture using a first function call to the graphics processing unit; and outputting second data, including the first data and the headers and footers in the first texture through a network port of the system.

The method can further include: creating a second texture in the memory graphics processing unit of the system; and copying third data for packetization from an input source into the second texture a second function call to the graphics processing unit, where the third data is arranged in the second texture in a first ordering, and the third data arranged in the first ordering is the first data.

The method can further include: creating a second texture in the memory graphics processing unit of the system, the second texture includes a correction map with coefficients; and before outputting the second data, performing a matrix operation using the graphics processing unit on the first texture with second texture; and outputting the second data as corrected with the second texture through the network port of the system.

The first data is not copied into the headers and footers of the first texture. These are reserved for network packet information. A source of the first data can be from outside the graphics processing unit, such as from a hard disk of the system, system memory, audio data, or other source. The source of the first data may be from inside graphics processing unit, such as video data generated by the graphics processing unit.

The first function can be implemented as a fragment shader program in the graphics processing unit. In an implementation, the copying first data for packetization into the spans of the first texture using a first function call to the graphics processing unit includes: using a first triangle operation to generate a first triangle in a first span of the first texture; and using a second triangle operation to generate a second triangle in a first span of the first texture. The copying first data for packetization into the spans may include for each span of the first texture, performing at least two triangle operations.

In an implementation, a system includes: first data for packetization residing in the system; an output port to output second data, which the first data after packetization; a graphics processing unit, connected to the output port, where the graphics processing unit includes graphics memory having a first texture organized to have a number of first locations in the first texture as headers, a number of second locations in the first texture as footers, a number of third locations in the first texture as spans, where each of the spans are rectangular, and positioned between a header and footer; and a fragment shader program, executing in the graphics processing unit, that copies the first data for packetization into the spans of the first text by using triangle operations, while avoiding copy the first data into the headers or fooders.

The output port can be an Ethernet port or video port. Each header in the first texture may be an Ethernet header packet. Each footer in the first texture may be an Ethernet footer packet. The graphics memory of the graphics processing unit includes a second texture including coefficients, and before outputting the second data through the output port, performing a matrix operation on the first and second textures.

The graphics memory of the graphics processing unit includes a second texture. The second texture does not include headers and footers like the first texture. The second data is transferred into the second texture before transferring into the first texture including headers and footers.

In an implementation, a method includes using a graphics processing unit to perform network packetization. The method includes specifying a texture in the graphics processing unit including network headers, network footers, and spans for data to be packetized, where the spans are between the network headers and network footers. The method includes copying data to be packetized into rectangular spans of a texture of the graphics processing unit using triangle operations permitted by the graphics processing unit. The method includes outputting data packetized using the graphics processing unit through an Ethernet port.

Any trademarks used in this patent are be property of their respective owners. The patent owner claims no proprietary interest in trademarks and trade names of others.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
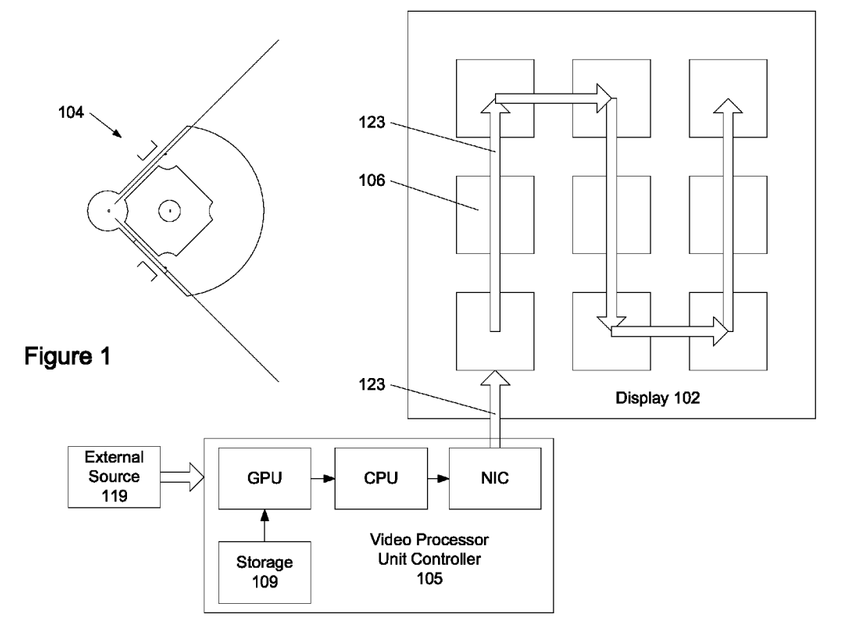
FIG. 1 shows a specific implementation of a system incorporating a technique of the invention.

FIG. 1 shows a specific implementation of a system incorporating a technique of the invention. The system has a large video display 102 that is used in such environments as a sports stadium 104 or arena (e.g., baseball, football, basketball, hockey, and soccer), concert venues and theaters, entertainments complexes, retail environments (e.g., shopping malls), outdoor venues and architectural buildings (e.g., billboards, signage, and side of buildings). For example, the display can be placed in the outfield of a baseball stadium to show video of a player at bat, highlights of the play, advertisements, and other video or graphics that provide information (e.g., statistics of the player at bat) or entertain (e.g., show fireworks when a player hits a home run) the fans.

Display 102 is which is made of a number of display panels 106. The figure shows nine display panels arranged in an array of rows and columns. However, the display can have any number of panels, typically more than nine, but depending on the size of a panel, can be fewer than nine panels or even a single panel.

The panels are typically joined together and interlocked to form a single contiguous panel. The panels can be arranged and interlocked in any orientation, such as a rectangular screen in landscape orientation, a rectangular screen in portrait orientation, or a long banner strip. Panels can also be arranged into separate sections, containing gaps, and these noncontiguous panels can be controlled simultaneously.

Figure 2A:
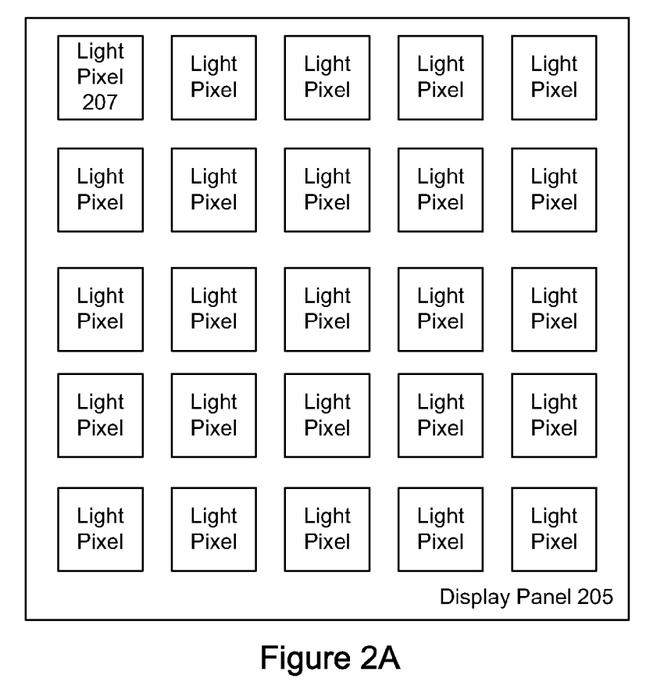
FIG. 2A shows a block diagram of the display panel.

Implementations of display panels are the display panel products by Barco. FIG. 2A shows a block diagram of an individual panel 205. As indicated above, any number of panels may be connected to each other to form a larger display panel. An individual panel has an array of light pixel elements 207. In the specific implementation of FIG. 2A, the panel has a five-by-five array of rows and columns of light pixels. However, in other implementations, there can be any number of rows and columns of light pixels, and in any dimension, such as 10 by 10, 32 by 32, 10 by 12, 32 by 16, 48 by 48, 64 by 64, 64 by 48, and so forth.

Figure 2B:
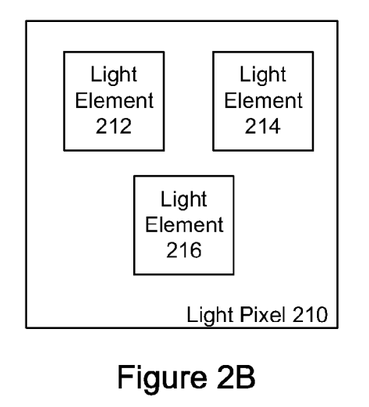
FIG. 2B shows a configuration of a light pixel for the display panel which uses three differently colored lighting elements.

Each light pixel 207 may be implemented using a lighting technology such as LEDs, OLEDs, lasers, lighting bulbs, and many others. FIG. 2B shows a specific pixel implementation, where each light pixel 210 has three light elements 212, 214, and 216. In a configuration, the light elements are LED lighting elements, where a first light element emits red light, a second light element emits green light, and a third light element emits blue light. Each light pixel 207 in display panel 205 can have a light pixel configuration as shown in FIG. 2B.

Figure 2C:
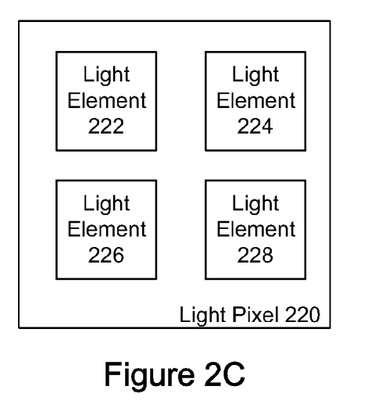
FIG. 2C shows a configuration of a light pixel for the display panel which uses four differently colored lighting elements.

FIG. 2C shows another pixel implementation, where each light pixel 220 has four light elements 222, 224, 226, and 228. In a configuration, the light elements are LED lighting elements, where a first light element emits red light, a second light element emits green light, a third light element emits blue light, and a fourth element emits cyan light. Each light pixel 207 in display panel 205 can have a light pixel configuration as shown in FIG. 2C.

Compared to light pixel configuration 210, light pixel configuration 220 has an additional light element of a different color than the other light elements in the pixel. Generally, this allows light pixel 220 to display a wider color gamut than light pixel 210.

In a specific implementation, the display panel uses light emitting diode (LED) technology. Each pixel of the panel has four LEDs of different colors (e.g., red, green, blue, and cyan). Other display panel technologies which may be used include organic LED (OLED), liquid crystal display (LCD), plasma, digital light processing (DLP), video projection, or cathode ray tube (CRT).

The display is driven by a video processor unit controller 105, which includes a graphics processing unit (GPU), central processing unit (CPU), and network interface card (NIC). The GPU processes video from a source such as internal storage 109 or external storage 119. The GPU may include one or more integrated circuits manufactured by Nvidia Corporation (e.g., GeForce and Tesla product lines), Advanced Micro Devices (AMD) (e.g., ATI Radeon™ product line), or Intel Corporation (e.g., Intel Graphics Media Accelerator product line), or combinations of these.

The CPU may be one or more integrated circuit processors manufactured by Intel (e.g., Core™ 2 Duo or Core i7), AMD (e.g., Athlon™ or Phenom™ product line), or International Business Machines Corp. (IBM) (e.g., PowerPC product line), or combinations of these.

In an implementation, video processor unit controller 105 communicates via the NIC to display 102 and its panels via an Ethernet connection 123. A specific implementation uses a gigabit connection, but other network topologies may be used. Examples include 10 megabits per second, 100 megabits per second, or others, and in any combination.

Communication is not limited to standard network connections. Other interfaces may be used such as display interface technologies (e.g., HDMI, DVI, or DFP). However, display interface technologies limit a distance between controller 105 and the display because of interference and noise, which become more significant as the distance increases.

Therefore, large displays 102 in large venues such as a stadium are typically connected using long length communication channels such as Ethernet, 802.3 Ethernet over fiber optic cable, or others. A controller 105 can then be located in a control booth behind and above home plate, while the display is behind center field.

The video source can be stored on internal storage 109, which can be a hard drive or solid state drive (SSD) which can be a video file or other file with instructions on what to display. Video rendering may be performed in real time by the GPU. Software or firmware executing on controller 105 reads the video file and handles performing the operations to display the video on the display. The video may be live video stream, prerecorded video, or text such as scoreboard information.

The video source may also be from external source 119, such as an external hard disk or a computer. Operation of controller 105 may by controlled using a PC and software running on the PC, which tells the controller what to do. A video file residing on the computer may be copied to the internal storage of the controller. Then the video file can be read directly from internal storage instead of from the PC or external source 119.

External source 119 may be implemented using a computer. Video processor unit controller 105 may also be implemented using, or be part of, a computer. For example, video processor unit controller 105 can be considered a specialized computer with a selection of components for video processing. Details of a computer are described in FIGS. 4-5 below. Further, the video processor unit controller can be implemented as one or more plug-in peripheral boards for a computer, or housed in a separate enclosure, connected to the computer via, for example, a USB connection.

Figure 3:
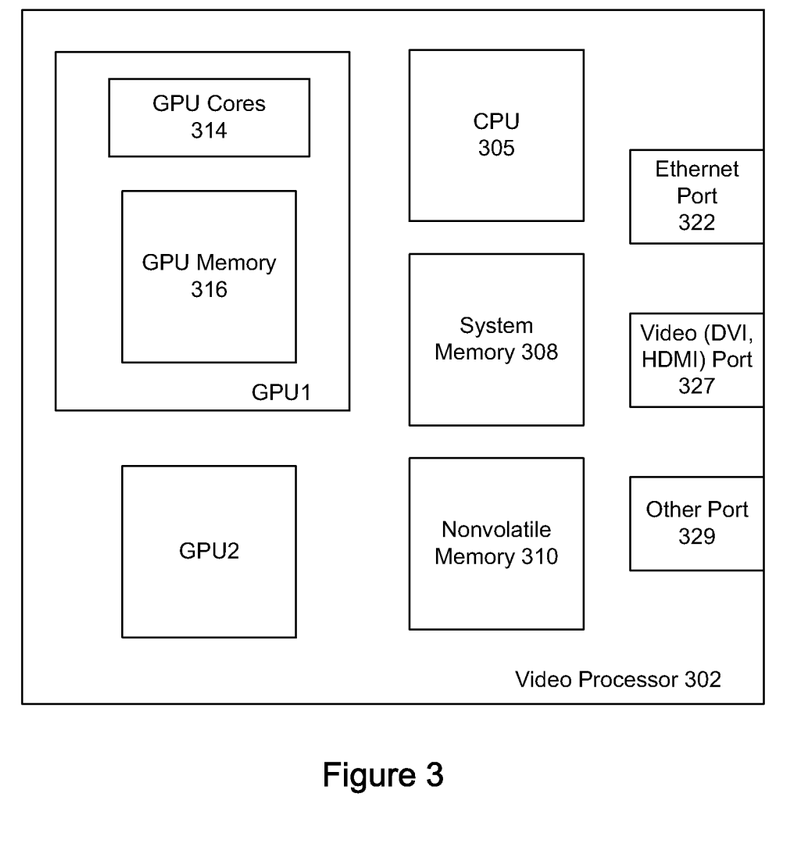
FIG. 3 show a block diagram of a video processor unit controller.

FIG. 3 shows a block diagram of a video processor 302. The video processor includes a CPU 305 (or multiple CPUs or multicore CPUs), system random access memory (RAM) 308, and nonvolatile memory 310. This nonvolatile memory may be flash memory, such as solid state disk (SSD), or optical or magnetic storage, such as a hard disk or CD, DVD, or Blu-ray media drive. Nonvolatile memory retains its stored content even after power is removed from the system. The CPU, system memory, and nonvolatile memory are connected together through a data bus, which allows these components to pass data between each other.

Further the video processor includes one or more GPUs, identified as GPU1 and GPU2. GPU1 and GPU2 may be the same GPU (i.e., homogeneous GPU system), or different GPUs (i.e., heterogeneous GPU system), such as different GPU products from the same manufacturer or GPU products from different manufacturers. The GPUs are connected to the data bus.

The internals of GPU1 are shown. The internals of GPU2 may be similar. GPU1 includes any number of GPU cores 314 and a GPU memory 316. The GPU memory is separate from the system memory. The GPU cores have a direct interface to the GPU memory, so data does not need to pass through the processor's data base. The GPU cores can operate directly on the GPU memory. Typically each GPU core can execute multiple threads simultaneously. For example, a GPU has 16 cores where each core can execute 16 threads. Then GPU1 can handle 256 threads.

Each of the threads may be a fragment, which are GPU routines or programs. Each GPU core can run the same fragment (e.g., operating on different locations of the GPU memory). Two-dimensional memory or textures may be defined or reserved within the GPU memory. A texture can be 512 by 512. A fragment may operate on different locations within a defined texture.

Video processor 302 includes some ports where data can be passed in or out of the processor. There is an Ethernet port 322, video port 325 (e.g., DVI or HDMI), or other port 329, in any combination. Typically the Ethernet port passes out network packets, and the video port passes out video data. Data processed by the components of the video processor, such as the CPU or GPU, can be output through one or more of these ports of the video processor.

An implementation of a video processor unit controller is a video processor or computing product by Barco. The video processor is an advanced LED screen controller for high definition video production. It combines five different products—a screen controller, pixel mapper, scaler, color corrector, and HD content delivery system—into one seamless, state-of-the-art solution with broadcast-quality playback.

In brief, the video processor preprocesses video for LED screens. Integrated with video processing software, the processor can shift pixels, recolor, and scale content to make LED screen setup and white balancing easier than ever.

The video processor provides flexibility and configurability, together with the advanced video processing technology, and handles challenging creative or technical video presentations. The video processor includes a built-in set of tools to create intricate visual arrangements with multiple real-time, high definition (HD) video streams. The processor has sufficient computational power to ensure smooth HD 1080P (i.e., 1080 vertical lines progressive) content delivery.

The video processor may be controlled remotely using an Internet Protocol (IP) enabled connection with controller and other software, future, or third party applications. The video processor presents users a graphical user interface with which to harness easily the video processor's underlying complexity.

In an implementation, the controller's enclosure is a rugged aluminum case with an internal, isolated shock-mounted chassis. This chassis is robust to withstand demanding environments in which the controller may be placed.

Figure 4:
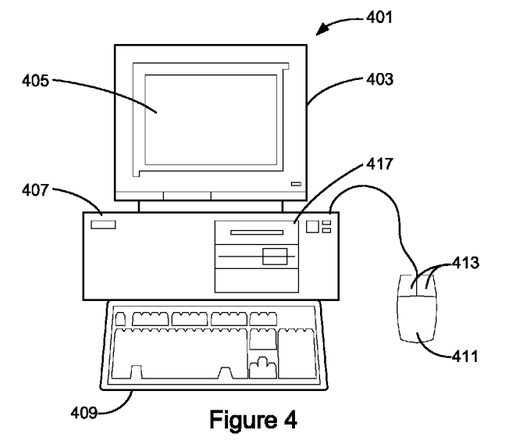
FIG. 4 shows a system of the present invention for performing network packetization via a graphics processing unit.

FIG. 4 shows an implementation of a system of the present invention. In an embodiment, the invention is a technique (such as in software or firmware) that executes on an electronic computing or computer system (e.g., stand-alone computer, client, or server), such as shown in FIG. 4. FIG. 4 shows a computer system 401 that includes a monitor 403, screen 405, enclosure 407, keyboard 409, and mouse or pointing device 411. Mouse 411 may have one or more buttons such as mouse buttons 413. Enclosure 407 (may also be referred to as a system unit, cabinet, or case) houses familiar computer components, some of which are not shown, such as a processor, memory, mass storage devices 417, and the like.

Mass storage devices 417 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version (e.g., a computer program product) of the invention may be embodied using, stored on, or associated with a computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 417. The source code of the software of the present invention may also be stored or reside on mass storage device 417 (e.g., hard disk, magnetic disk, tape, or CD-ROM). As a further example, code of the invention may be transmitted via wires, radio waves, or through a network such as the Internet.

Figure 5:
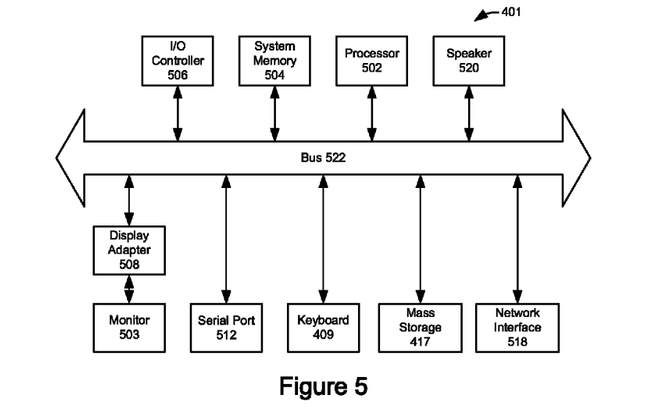
FIG. 5 shows a simplified system block diagram of a computer system used to execute a technique of the invention.

FIG. 5 shows a system block diagram of computer system 401 used to execute software of the present invention. As in FIG. 4, computer system 401 includes monitor 403, keyboard 409, and mass storage devices 417. Computer system 401 further includes subsystems such as central processor 502, system memory 504, input/output (I/O) controller 506, display adapter 508 (which can include one or more graphics processing units or GPUs), serial or universal serial bus (USB) port 512, network interface 518, and speaker 520. The invention may also be used with computer systems with additional or fewer subsystems. For example, a computer system could include more than one processor 502 (i.e., a multiprocessor system) or the system may include a cache memory.

The processor may contain multiple processor cores (e.g., two, three, or four or more) on a single integrated circuit. The system may also be part of a distributed computing environment. In a distributed computing environment, individual computing systems are connected to a network and are available to lend computing resources to another system in the network as needed. The network may be an internal or local Ethernet network (e.g., 10, 100, or 1000 megabits per second Ethernet), Internet, or other network. The system may include one or more graphics processing units, which may reside on the display adapter or be part or another subsystem.

Arrows such as 522 represent the system bus architecture of computer system 401. However, these arrows are illustrative of any interconnection scheme serving to link the subsystems. For example, speaker 520 could be connected to the other subsystems through a port or have an internal connection to central processor 502. Computer system 401 shown in FIG. 4 is but an example of a computer system suitable for use with the present invention. Other configurations of subsystems suitable for use with the present invention will be readily apparent to one of ordinary skill in the art.

When a system has multiple GPUs, these GPUs can be connected via the system bus. Or the GPUs may be also directly connected together via another separate bus (e.g., Nvidia SLI bus, ATI CrossFire bus, PCI-E bus, or other).

Computer software products may be written in any of various suitable programming languages, such as C, C++, C#, Pascal, Fortran, Perl, Matlab (from MathWorks, Inc.), SAS, SPSS, Java, or JavaScript, or any combination of these. The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation).

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows CE, Windows Mobile), Linux, HP-UX, UNIX, Sun OS, Solaris, Mac OS X, Alpha OS, AIX, IRIX32, or IRIX64, or combinations of these. Microsoft Windows is a trademark of Microsoft Corporation. Other operating systems may be used. A computer in a distributed computing environment may use a different operating system from other computers.

Furthermore, the computer may be connected to a network and may interface to other computers using this network. For example, each computer in the network may perform part of the task of the many series of steps of the invention in parallel. Furthermore, the network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

Moving high bandwidth video data to the network layer from a GPU is a demanding task. High definition (HD) bandwidth content requires the movement of several gigabytes of data per second.

To send video data via a network, this data is packetized. Packetizing consists of splitting the data into chunks, and inserting headers and footers into the data that the network hardware needs for routing.

Typically this involves reading back the GPU generated video frame into the CPU, and generating packets with chunks of video data and appropriate header and footer fields. These packets are then output through network 123 to display 102. The network described is an Ethernet local area network, but the technology may also be applied to transmission video data over a wide area network such as the Internet or using other non-Ethernet based technologies.

Figure 6A:
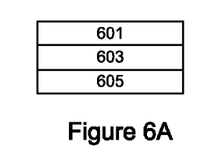
FIGS. 6A-6B show a technique of packetizing performed by a central processing unit via a sequential scan algorithm.
Figure 6B:
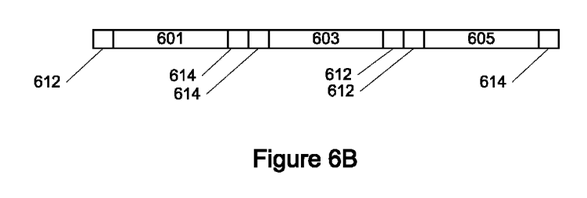

More specifically, packetizing is performed by a central processing unit (CPU) via a sequential scan algorithm. In FIG. 6A, a graphics processing unit (GPU) generates video data 601, 603, and 605. The data is passed to the CPU, which processes it. In FIG. 6B, the CPU copies the data sequentially starting with video data 601. So header 612 is generated, video data 601 is copied, followed by the generation of footer and header 614, copy video 603, generate footer header 612, copy video data 605, and then the final footer 614.

Table A describes a flow for packetizing by the CPU via a sequential scan algorithm.

TABLE A

```
// (1) draw a frame
DrawFrame( )
WaitForFrameToFinishDrawing( )
// get a pointer to the completed frame
frame_ptr = ReadFrame( )
// (2) create buffer for our packets
packets = CreatePacketBuffer( )
// iterate over all connected nodes
for each ( node in Nodes )
   // fill in header
   packets.Append( node.Header( ) )
   // copy corresponding video data
   packets.Append( frame.DataForNode( node ) )
// (3) transmit packets
SendPackets( packets )
```

A technique avoids performing step 2 (see table A) of the above approach in the CPU is to have the GPU perform the packetization step. This is advantageous as it reduces memory transfers and avoids having to generate packet headers for every frame.

By using the GPU instead of the CPU to perform packetization, this improves data throughput. A typical GPU is capable of performing a greater number of tasks in parallel than a typical CPU. For example, a specific GPU has 32 cores, each of which can handle 32 threads. This GPU can handle processing 1024 threads simultaneously. This is a far greater number of threads than a CPU. Multiple GPUs can be operated in parallel to improve the processing power more. Further, when packetizing video data, the video data can remain in GPU memory, which reduces the number of memory transfers. The technique may be applied to packetizing of any type of data, not just video data or data that is passed to or displayed on video screens, including file transfers, e-mail, text messaging, video conferencing, audio data, voice over IP telephony data, and Internet data. This patent describes a specific implementation of packetizing video data to provide an example.

Table B describes a flow for packetizing using the GPU algorithm. Step 2 of table A are performed in the GPU: create buffer for the packets, iterate over connected nodes to fill in header, and copy corresponding video data.

TABLE B

```
// (1) draw a transmogrified frame
DrawTransmogrifiedFrame( )
WaitForFrameToFinishDrawing( )
// get a pointer to the completed frame
frame_ptr =ReadFrame( )
// (2) transmit packets
SendPackets( frame_ptr )
```

The data packetized via the GPU may be output through a computer Ethernet port or another computer port. For example, packetized data may be output through an HDMI or DVI port, which would provide higher throughput than a typical 100 megabits per second Ethernet port. For example, a single DVI port passes data at 3.96 gigabits per second in single-link mode and 7.92 gigabits per second in dual-link mode.

A technique of the invention to packetize data using a GPU may be implemented in software. For example, this software may be implemented as a part of the driver, library, or other routines provided by the GPU manufacturer, or combinations of these. Then a user can packetize using the GPU by calling one or more routines provided in the driver or library, or combination.

By using the GPU to packetize data rather than the CPU and network hardware (e.g., NIC), the output throughput of, for example, video data can be increased. In a specific implementation, throughput increases approximately five times or greater. In the specific application of driving displays, one video controller using GPU packetization will be able to handle a larger display or greater number of displays than a video controller using a CPU and the network hardware.

However, this is difficult to accomplish in practice due to the GPU architecture because GPUs are not designed to perform packetization. In particular: (i) GPUs are stream processors that operate on arrays of data simultaneously. Maintaining state information such as how far along a packet we have scanned is not possible. (ii) GPUs operate at a pixel level. Writing a single byte of data is generally not possible. (iii) GPUs perform hidden operations such as scaling, floating point aliasing, and gamma correction. These can easily corrupt packet data if care is not taken to prevent such artifacts. (iv) GPUs cannot read from the frame buffer they are writing to, disallowing many "natural" implementations of a GPU packetization process. (iv) GPUs often pad data in arrays for the purposes of speed optimization. Padding within packet data cannot be tolerated.

If the header and footer data is relatively stable or static, then the following technique to utilize the GPU can be used:

(a) In the CPU, build the set of headers and footers into memory as if we had data to send to the network layer.

(b) Convert this data to be formatted as a two-dimensional GPU array (texture). Make sure that gamma correction, scaling, and float aliasing will not affect the results.

(c) Build a set of GPU instructions describing how to geometrically transform video into video packets. These are carefully crafted to preserve the static header and footer data and only manipulate the video portion. Additionally any texture limitations and boundary edge conditions must also be taken into account.

(d) Upload the converted data and the transform list to the GPU. These two sets of data are static and unchanging. So the time taken to generate and upload them—although possibly significant—is not a factor in the overall run-time performance.

Then for each frame:

1. Run the transform list (c) stream on the current video frame. This will transmogrify and copy the video frame into generated packet texture (b) while avoiding the previously formatted static packet header and footer data.

2. Pass a pointer to the packet texture (b) directly to the network layer. The network layer can directly operate on this data because it has been transformed into a useable format through the described technique above.

FIGS. 7A-7D show a technique of packetizing performed by using a GPU.

Figure 7A:
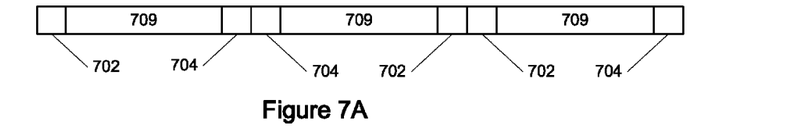
FIGS. 7A-7D show a technique of packetizing performed by using a graphic processing unit.

In FIG. 7A, generate the header 702 and footer 704 data with empty video data 709 in memory.

Figure 7B:
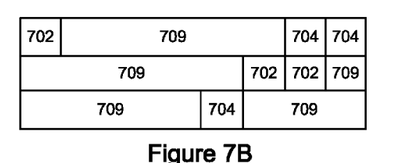

In FIG. 7B, upload the one dimensional header and footer data 7A, as a two-dimensional texture 7B into the GPU. This texture memory contains the headers, footers, and spans for the data to be transmitted as packetized data. The texture memory can be selected to be any dimension and size, such as 512 pixels by 512 pixels, 512 by 16, 24 by 1024, 256 by 256, 256 by 128, 1920 by 1080, 800 by 600, 640 by 480, or other sizes. The headers, footers, and spans are typically rectangular portions of the texture memory.

In a specific implementation, this upload process is accomplished using an OpenGL API function call glTexImage2D. The glTexImage2D function call is supported by GPUs from Nvidia and AMD.

Figure 7C:
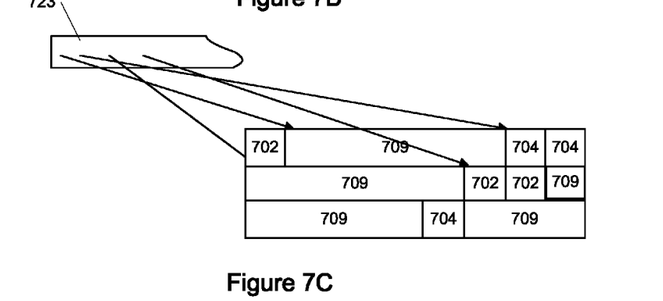

In FIG. 7C, generate a two-dimensional (2D) geometric transfer list 723 for the GPU and upload it. This geometric transfer list describes how to map video data 734 into packets 748. This is accomplished by essentially mapping strips of video 734 into the appropriate places, where strips are carefully calculated to avoid the already uploaded header and footer data 7B.

GPUs and drivers of the GPUs typically do not have memory move instructions like a CPU. Instead GPUs have instructions for drawing triangles into the texture memory. These triangles can be specified by vertexes of the triangle. Therefore, using GPU instructions, data can be transferred into the spans of the texture memory (for packetization), avoiding the header and footer regions, by drawing triangles specifically into spans of the texture memory. For example, for a span, a upper half of a triangle and a lower half of a triangle may be drawn to fill the span.

More specifically, as such the geometric transfer list contains a series of vertex and texture coordinates for each strip. These coordinates are uploaded to the GPU using a vertex buffer object (VBO). In a specific implementation, OpenGL functions and extensions glBindBuffer, glBufferData, and glInterleavedArrays are used. However, other techniques may be used including using such OpenGL calls as glTexCoord2d and glVertex2D.

Figure 7D:
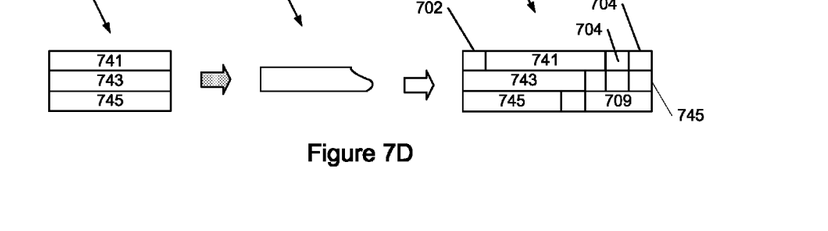

In FIG. 7D, after each frame is drawn 734 (e.g., video data 741, 743, and 745), use transfer list 723 in combination with a GPU custom fragment shader program to transmogrify from the frame buffer of the GPU to the packet texture GPU. A custom fragment shader is used to perform color conversion and correction. The result is packetized video data 748, where the final video data (e.g., 741, 743, and 745) has been placed between header 702 and footer 704 data.

Transmogrification 723 may not be limited to a single stage. Additional stages may be added as needed to perform any required video processing.

Packetized texture pointer 748 of video data can be passed to the network hardware. The network hardware can send the packetized texture pointer directly out the Ethernet port. There is no need for further processing by the CPU.

Figure 8A:
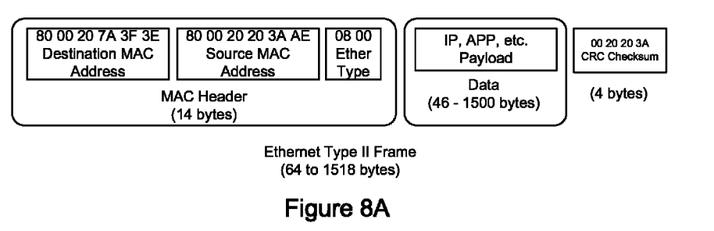
FIGS. 8A-8D show a technique of avoiding network layer overhead.

In a specific implementation, a technique avoids network layer overhead. FIG. 8A above shows the format of an 802.3 Ethernet frame. This frame contains three pieces of data: (i) MAC header, which dictates what the data is, who it is from, and where it is going; (ii) data, which is the actual information being transferred; and (iii) CRC checksum, which verifies that both the header and data are correct.

In turn the data itself will include additional headers and data dictated by the embedded protocol. In the case of typical TCP/IP Internet traffic, this would be an IP header followed by a TCP header and then finally the associated data.

When an Ethernet frame is received by a NIC, the NIC notifies an attached device driver. This device driver then processes that frame and passes it to the respective subsystem. Data is processed and passed on down the chain until eventually it is completely processed or discarded.

Likewise when sending a frame, the appropriate subsystems append their respective headers and pass it along the chain until it is finally transmitted.

A specific technique minimizes the chain of subsystems by using a packet driver (e.g., the open source WinPcap packet driver). The specific technique described uses the WinPcap packet driver, but other implementations may use other drivers, software, or custom or proprietary code.

This driver receives raw Ethernet frames and provides them directly to other software components (e.g., the calling application program or routine) for handling. When sending data, an application program (e.g., program to send graphics information) generates the raw Ethernet frames to be transmitted. This means the application program is solely responsible for assembling all of the respective Ethernet frame headers and data. The application program can safely ignore the CRC checksum as it is calculated and appended by the NIC.

In a specific implementation, a parameter specified to the packet driver is a pointer to the texture memory with the headers and spans. Then the packet driver will pass the packetized data in the texture memory (as it is generated by the GPU) out the Ethernet port of the computer. Since the packet driver has a pointer to the memory where the packetized data is generated by the GPU, the packetized data does not need to be streamed through the CPU to the packet driver. This further improves efficiency.

Figure 8B:
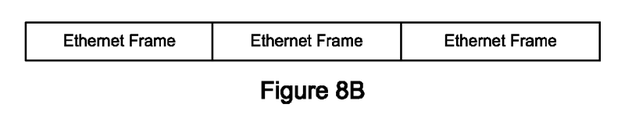

FIG. 8B shows the raw Ethernet frames. However, these raw Ethernet frames cannot be directly given to the Winpcap driver as these Ethernet frames do not contain any explicit length data. As such, an additional Winpcap specific header is needed to provide that information.

Figure 8C:
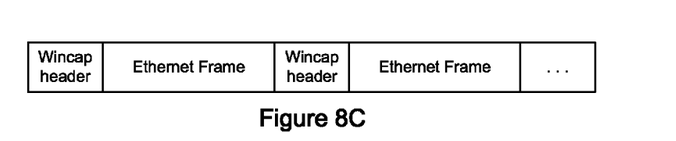

Normally the Winpcap library would preappend these headers on the calling program's behalf before passing the data to the driver. However, in a specific implementation, the technique skips this step and generates all of the headers in one pass. This means data can be directly provided from GPU memory to the Winpcap device driver, which further increases throughput. FIG. 8C shows the resulting headers (labeled Winpcap header) and Ethernet frames.

Figure 8D:
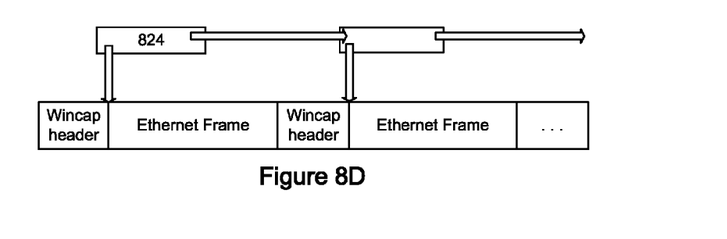

The Winpcap device driver then processes these Winpcap headers and as shown in FIG. 8D, creates a linked list of low level Network Device Interface Specification (NDIS) data structures 824 pointing at the provided Ethernet frames. In other words the Winpcap device driver processes its headers and passes pointers to GPU memory to the lower level NIC specific device drivers.

These lower level drivers then arrange for the respective frames to be transmitted. The NDIS device driver is referencing GPU memory directly, so no extraneous memory copies are needed.

The technique of packetizing information using a GPU is described with respect video information to provide merely one example. The technique is also applicable to the packetization of any type of information to be sent over a network. Some examples of other types of information that can be packetized using the GPU include audio, speech, VOIP telephony, real-time news or financial, Internet services, defense, satellite telemetry, and others.

Figure 9:
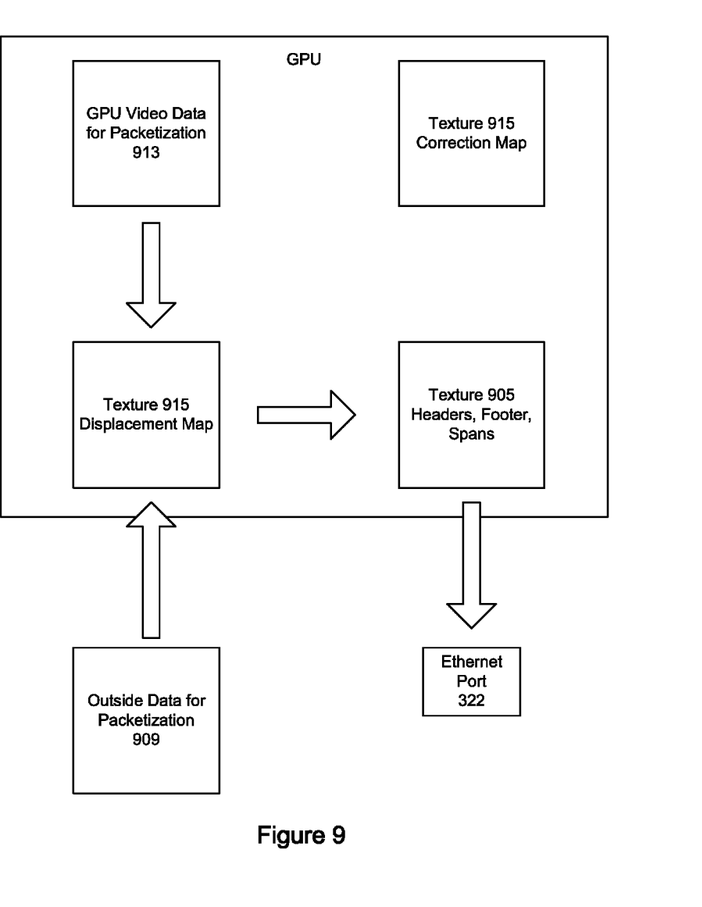
FIG. 9 shows a block diagram of a specific implementation a GPU packetization technique.

FIG. 9 shows a block diagram of a specific implementation a GPU packetization technique. A flow of this packetization technique is described further below. A specific implementation of a flow for packetizing using a GPU is presented in this patent, but it should be understood that the invention is not limited to the specific flow and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data.

1. Create a texture 905 in GPU memory for headers, footers, and spans as discussed above. This texture may be referred to as a spans texture. The Ethernet port is mapped to texture 905, so data in this texture memory are passed through the Ethernet port and out the system.

2. The source of information to be packetized comes from either (i) outside data 909, which is data generated outside of the GPU or (ii) inside data 913, which is data generated by the GPU (such as video data processed or generated by the GPU). The source of information may be a combination of outside data (i) and inside data (ii).

This data to be packetized is copied into a texture 915 in the GPU. Texture 915 can be referred to as a displacement map. In an implementation, the data to be packetized is copied into the displacement map in a queue order representative of an order the data will be passed out of the system. For example, a first data in a queue to be passed out of the system will be placed into in a first position in texture 915, while a second data in a queue to be passed out of the system after the first data is placed into a second position in texture 915.

3. Data in displacement map texture 915 is transferred into spans texture 905. This data transfer is accomplished using GPU instructions, such as copy triangles from the displacement map into spans texture 905. First data in the queue of the displacement map texture will be copied into a first span in texture 905. Second data in the queue of the displacement map texture will be copied into a second span in texture 905, where this second span is after the first span.

The packetization flow uses a displacement map. Using a displacement map is optional and other implementations do not need to use a displacement map. Outside data 909 or inside data 913, or both, may be directly copied using copy triangle operations from the data source into span texture 905. However, copying the data from the data sources into the displacement map first, and then transferring to texture 905 from the displacement map, reduces the number of GPU operations needed, thus increasing throughput.

The data at sources typically is not arranged in an order for passing out the port of the system. The ability to transfer data using the GPU is limited due to the instruction set typically limited to graphics operation (e.g., draw triangle operations). Fewer draw triangle operations are needed to copy the data from the displacement map into texture 905 than from the sources themselves.

4. An optional step is to perform matrix operations on the data. The coefficients of variables from this matrix operation may be held in a texture 915, which may be referred to as a correction map. The GPU may perform a matrix operation between texture 905 and 915.

In a specific implementation, the correction map is used to adjust the colors of the data being passed out of the system to the display panels. Each display panel typically has particular color characteristics that differentiate it from other panels. With the same video data, without correction, one panel may appear to be differently colored than another panel, which might be an adjacent panel. This is undesirable. Therefore, before the data is output to the displays, the GPU can correct the video data using a correction map. This correction map corrects the outgoing data so that the data each display panel receives will allow it to display video with colors consistent with the other display panels in a particular group.

The above flow is repeated as needed to packetized and flow data out the port of the system. As FIG. 9 indicates, the locations and cores performing the operations are within the GPU, which for the reasons (such as parallelism) discussed above improve throughput and reduce the number of memory transfers to system or main memory. However, GPU instructions are used, which are generally limited with respect to CPU instructions. With the GPU performing the packetization operation, the system CPU will be more lightly loaded so it can perform other tasks.

Figure 10:
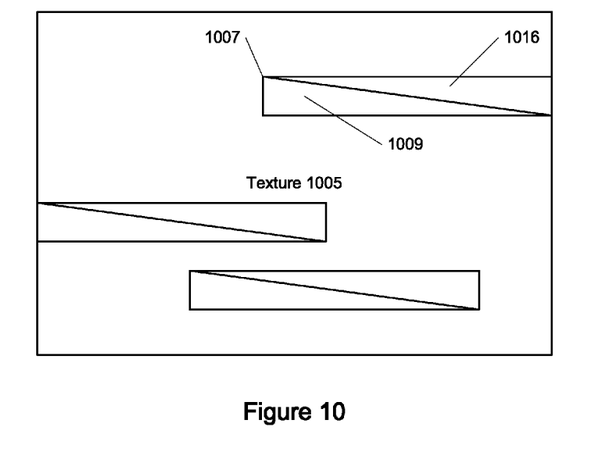
FIG. 10 shows an example of using GPU triangle operations to transfer data into a texture memory with spans, while avoiding header and footer locations within the texture memory.

FIG. 10 shows an example of using GPU triangle copy instructions to copy data into a texture memory 1005 with spans. The headers and footers are not shown in this figure. We want to copy data into a span 1007 of texture 1005. To do this using the GPU, we specify the coordinates (e.g., vertices) of a first triangle 1009 to be drawn. Drawing triangle 1007 fills span partially with data. Since the span is rectangular, the triangle 1007 is usually half the size of the span, so the span is half filled with data. To complete the transfer operation, we specify the coordinates (e.g., vertices) of a second triangle 1016 to be drawn. This will complete the data transfer for span 1007. The other spans in text are filled similarly with the data. This approach of using GPU to write triangles into the texture memory avoids writing regions reserved for the headers and footers.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method of operating an electronic system comprising:
   creating a first texture in memory of a graphics processing unit of the system;
   reserving a plurality of first locations in the first texture as headers;
   reserving a plurality of second locations in the first texture as footers;
   reserving a plurality of third locations in the first texture as spans, wherein each of the spans is positioned between a header and footer;
   using the graphics processing unit, copying first data for packetization into the spans of the first texture;
   outputting second data from the graphics processing unit, wherein the second data comprises the first data and the headers and footers in the first texture through a port of the system;
   creating a second texture in the memory of the graphics processing unit of the system; and
   using the graphics processing unit, copying third data for packetization from an input source into the second texture, wherein the third data is arranged in the second texture in a first ordering, and the third data arranged in the first ordering is the first data.

2. The method of claim 1 wherein the port of the system is a network port.

3. The method of claim 1 wherein the port of the system is a display port.

4. The method of claim 1 wherein the first data is not copied into the headers and footers of the first texture.

5. The method of claim 1 wherein a source of the first data is outside of the graphics processing unit.

6. The method of claim 1 wherein a source of the first data is from inside the graphics processing unit.

7. The method of claim 1 wherein the first function is implemented as a fragment shader program in the graphics processing unit.

8. The method of claim 1 wherein the copying first data for packetization into the spans of the first texture using a first function call to the graphics processing unit comprises:
using a first triangle operation to generate a first triangle in a first span of the first texture; and
using a second triangle operation to generate a second triangle in a first span of the first texture.

9. The method of claim 1 wherein the copying first data for packetization into the spans comprises:
for each span of the first texture, performing at least two triangle operations.

10. A method of operating an electronic system comprising:
creating a first texture in memory of a graphics processing unit of the system;
reserving a plurality of first locations in the first texture as headers;
reserving a plurality of second locations in the first texture as footers;
reserving a plurality of third locations in the first texture as spans, wherein each of the spans is positioned between a header and footer;
using the graphics processing unit, copying first data for packetization into the spans of the first texture;
outputting second data from the graphics processing unit, wherein the second data comprises the first data and the headers and footers in the first texture through a port of the system;
creating a second texture in the memory of the graphics processing unit of the system, wherein the second texture comprises a correction map with coefficients;
before outputting the second data, performing a mathematical operation using the graphics processing unit on the first texture with second texture; and
outputting the second data as corrected with the second texture through the port of the system.

11. The method of claim 10 wherein the port of the system is a network port.

12. The method of claim 10 wherein the port of the system is a display port.

13. The method of claim 10 wherein the first data is not copied into the headers and footers of the first texture.

14. The method of claim 10 wherein a source of the first data is outside of the graphics processing unit.

15. The method of claim 10 wherein a source of the first data is from inside the graphics processing unit.

16. The method of claim 10 wherein the first function is implemented as a fragment shader program in the graphics processing unit.

17. The method of claim 10 wherein the copying first data for packetization into the spans of the first texture using a first function call to the graphics processing unit comprises:
using a first triangle operation to generate a first triangle in a first span of the first texture; and
using a second triangle operation to generate a second triangle in a first span of the first texture.

18. The method of claim 10 wherein the copying first data for packetization into the spans comprises:
for each span of the first texture, performing at least two triangle operations.

19. A system comprising:
first data for packetization residing in the system;
an output port to output second data, which is the first data after packetization;
a graphics processing unit, coupled to the output port, wherein the graphics processing unit comprises graphics memory comprising a first texture organized to have a plurality of first locations in the first texture as headers, a plurality of second locations in the first texture as footers, a plurality of third locations in the first texture as spans, where each of the spans is positioned between a header and footer;
a fragment shader program, executing in the graphics processing unit, that copies the first data for packetization into the spans of the first texture while avoiding copying the first data into the headers or footers,
wherein the graphics memory of the graphics processing unit comprises a second texture comprising coefficients, and before outputting the second data through the output port, the graphical processing unit performs a mathematical operation on the first and second textures.

20. The system of claim 19 wherein the output port is a network port.

21. The system of claim 19 wherein the output port is a display port.

22. The system of claim 19 wherein the output port is an Ethernet port.

23. The system of claim 19 wherein the output port is a video port.

24. The system of claim 19 wherein each of the headers in the first texture comprises an Ethernet header packet.

25. The system of claim 19 wherein each of the footers in the first texture comprises an Ethernet footer packet.

26. A system comprising:
first data for packetization residing in the system;
an output port to output second data, which is the first data after packetization;
a graphics processing unit, coupled to the output port, wherein the graphics processing unit comprises graphics memory comprising a first texture organized to have a plurality of first locations in the first texture as headers, a plurality of second locations in the first texture as footers, a plurality of third locations in the first texture as spans, where each of the spans is positioned between a header and footer;
a fragment shader program, executing in the graphics processing unit, that copies the first data for packetization into the spans of the first texture while avoiding copying the first data into the headers or footers,
wherein the graphics memory of the graphics processing unit comprises a second texture, the second texture not including headers and footers, and the graphical processing unit transfers third data into the second texture before transferring the third data into the first texture, which comprises the headers and the footers.

27. The system of claim 26 wherein the output port is a network port.

28. The system of claim 26 wherein the output port is a display port.

29. The system of claim 26 wherein the output port is an Ethernet port.

30. The system of claim 26 wherein the output port is a video port.

31. The system of claim 26 wherein each of the headers in the first texture comprises an Ethernet header packet.

32. The system of claim 26 wherein each of the footers in the first texture comprises an Ethernet footer packet.

* * * * *